Figure 1:
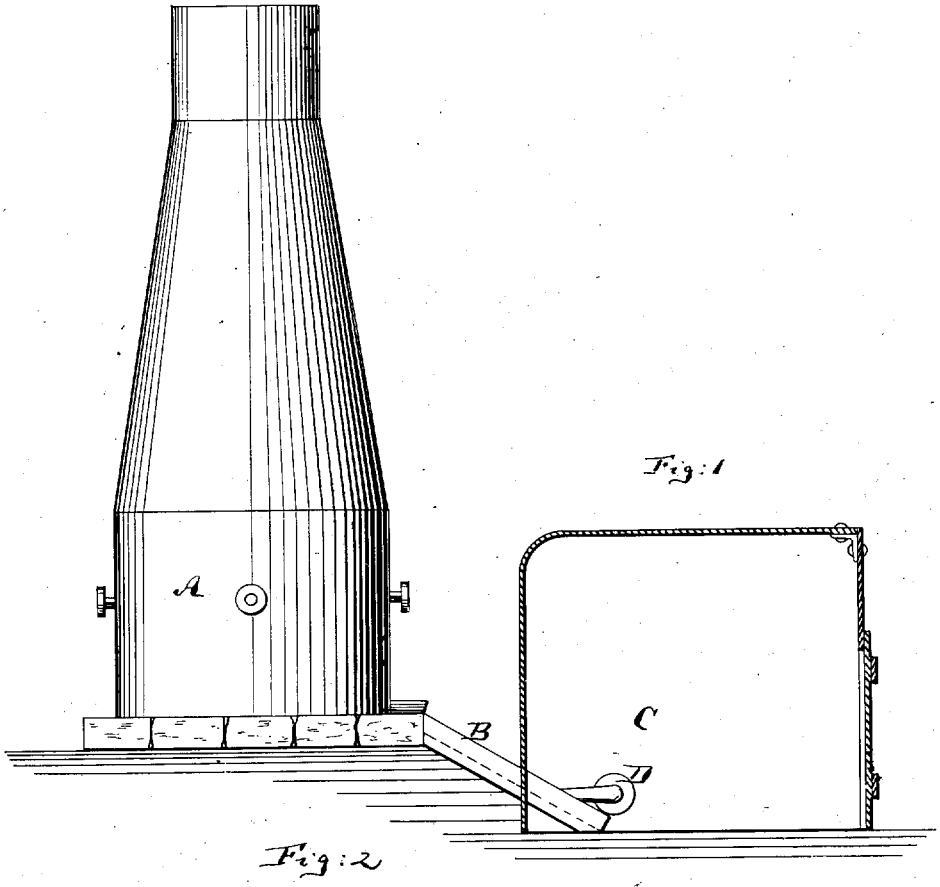

J. PLAYER, Dec'd.

AUGUSTA AMELIA GLEITSMANN, Adm'x.

MINERAL WOOL.

No. 6,895. Reissued Feb. 1, 1876.

Witnesses:

A. Moraga.

F. V. Briesen

Augusta Amelia Gleitsmann by her attorney

A. V. Briesen

UNITED STATES PATENT OFFICE.

AUGUSTA AMELIA GLEITSMANN, OF ASHEVILLE, N. C., ADMINISTRATRIX OF JOHN PLAYER, DECEASED, FOR HERSELF, AND AS ASSIGNEE OF HENRY McALLISTER, JR., ADMINISTRATOR OF SAID JOHN PLAYER.

IMPROVEMENT IN MINERAL WOOL.

Specification forming part of Letters Patent No. 103,650, dated May 31, 1870; reissue No. 6,895, dated February 1, 1876; application filed December 28, 1875.

DIVISION B.

*To all whom it may concern:*

Be it known that JOHN PLAYER, deceased, sometime of Norton, near Stockton-on-Tees, in the county of Durham, in England, and a subject of the Kingdom of Great Britain, late of the city and county of Philadelphia, in the State of Pennsylvania, was in his lifetime the inventor or discoverer of an Improved Mineral Wool.

The abundance and cheapness of the ready-made vitrified material afforded by the waste of slag or scoria at blast-furnaces and glass-works will doubtless render it unnecessary to prepare scoriaceous substances expressly for this product; but should it be deemed or found more economical or otherwise desirable, a mixture of silicious, calcareous, and other ingredients may readily be made and vitrified after various well-known formulæ.

From the slag or scoria, which may be subjected to the process hereinafter described, is obtained the improved vitrified fibrous material or mineral wool, highly non conducting, incombustible, and especially adapted to many uses, of which it may suffice to enumerate the covering or jacketing of steam-pipes, steam-boilers, hot-blast pipes, and the like, the lining of refrigerators, the filling of fire-proof safes, and other similar applications for preventing the transmission of heat or arresting the spread of fire. This material may be used in bulk or formed into sheets or pads in the same manner as hair, felt, or cotton wadding is formed, or it may be spun into rope or yarn, and applied in various ways that are obvious.

The invention consists of the new mineral wool or fibrous material, which is obtained by melting slag, scoria, or scoriaceous substances, in a cupola or furnace of suitable construction adapted to the purpose, and from which a suitable conduit is provided, so that the melted mass may be allowed to flow from the cupola or furnace in a small stream. Upon this flowing mass a stream or blast of air—by preference a hot-blast—is directed by any suitable device, and this blast of air, acting upon the flowing slag or other mineral, separates or subdivides it into exceedingly fine filaments or fibers, which are blown off into and retained in a suitable chamber or room provided over the blast. From this receptacle it may be removed to be packed or for use. Instead of a blast of air or hot air alone, a jet of air and steam or of steam alone, either ordinary or superheated, may be directed upon the flowing slag or other mineral without affecting the result otherwise than perhaps in degree.

The annexed drawing will show the form of apparatus which the said JOHN PLAYER had devised for the production of said mineral wool.

Figure 2:
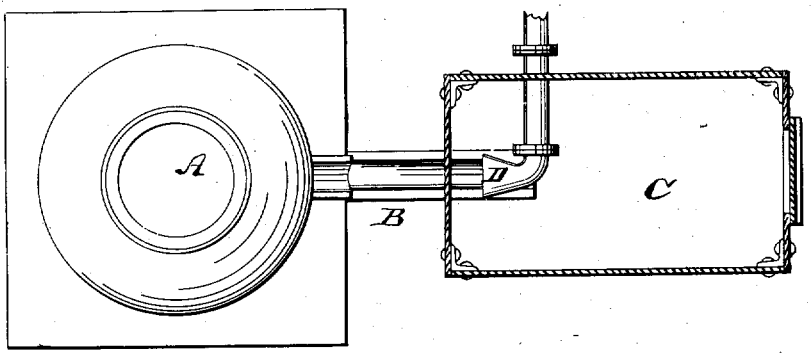

Figure 1 is an elevation of a furnace, with the chamber for receiving the mineral wool, in section; Fig. 2, a plan with the chamber in section.

The blast of air or jet of steam, or of air and steam, may be obtained or derived from a fan, or from a boiler and fan, or in any other way. The slag or scoria, or scoriaceous substance, is melted or produced in a suitable furnace, A, and flows down an inclined hearth, B, into a chamber, C, where it is exposed to a blast or jet from a pipe or nozzle or tuyere, D. The fibrous material produced by the blast being very light is blown against the walls of the chamber and deflected into the chamber behind the blast-pipe, where it accumulates until removed.

It is obvious that the blast or jet might be applied to the slag as it runs from an ordinary blast-furnace and thus save the reheating of the slag, and this would perhaps constitute the simplest mode of producing the wool.

The apparatus above described, however, forms no part of the subject-matter herein claimed, as the same may be varied at the dictates of convenience or economy; but

What is claimed herein as the invention of the said JOHN PLAYER is—

As a new article of manufacture, the improved mineral wool herein described.

AUGUSTA AMELIA GLEITSMANN.

Witnesses:
V. K. SPEAR,
GEO. A. HOOVER.